April 9, 1940.  J. E. MINTY  2,196,468
DROP PIT APPARATUS
Filed Nov. 7, 1935  7 Sheets-Sheet 1

Inventor;
John E. Minty.
BY Parker Carlson Pitzner & Hubbard
Attorneys.

April 9, 1940.                J. E. MINTY                2,196,468
                          DROP PIT APPARATUS
                          Filed Nov. 7, 1935              7 Sheets-Sheet 2
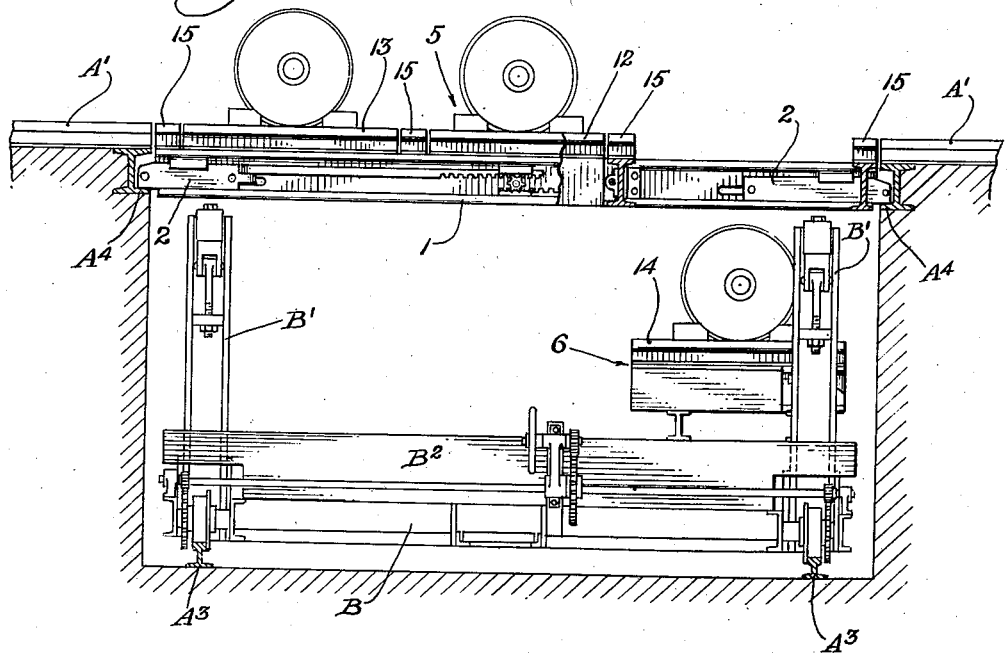
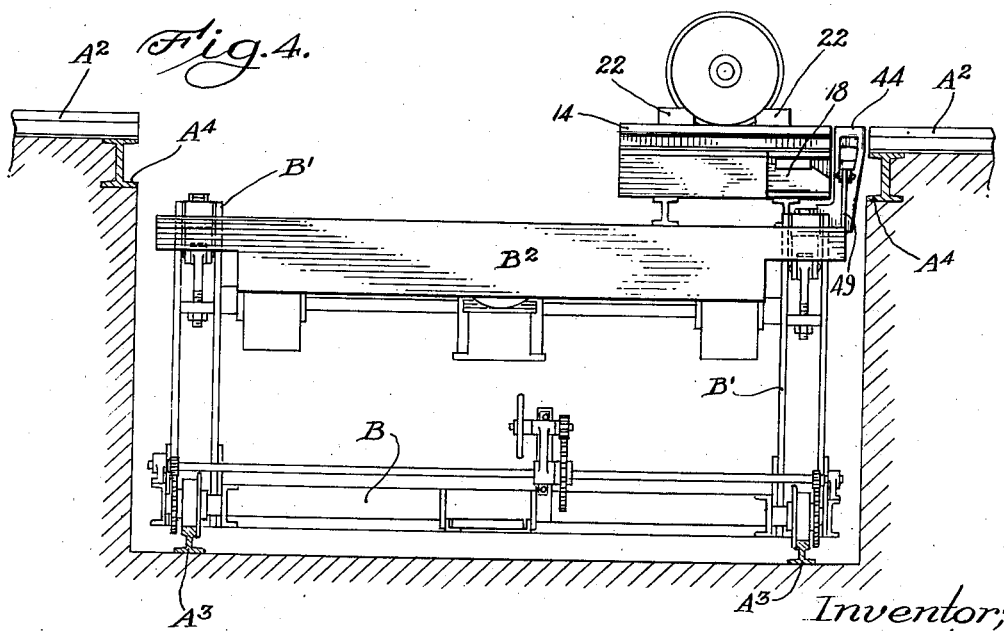

April 9, 1940.　　　　J. E. MINTY　　　　2,196,468
DROP PIT APPARATUS
Filed Nov. 7, 1935　　　7 Sheets-Sheet 3
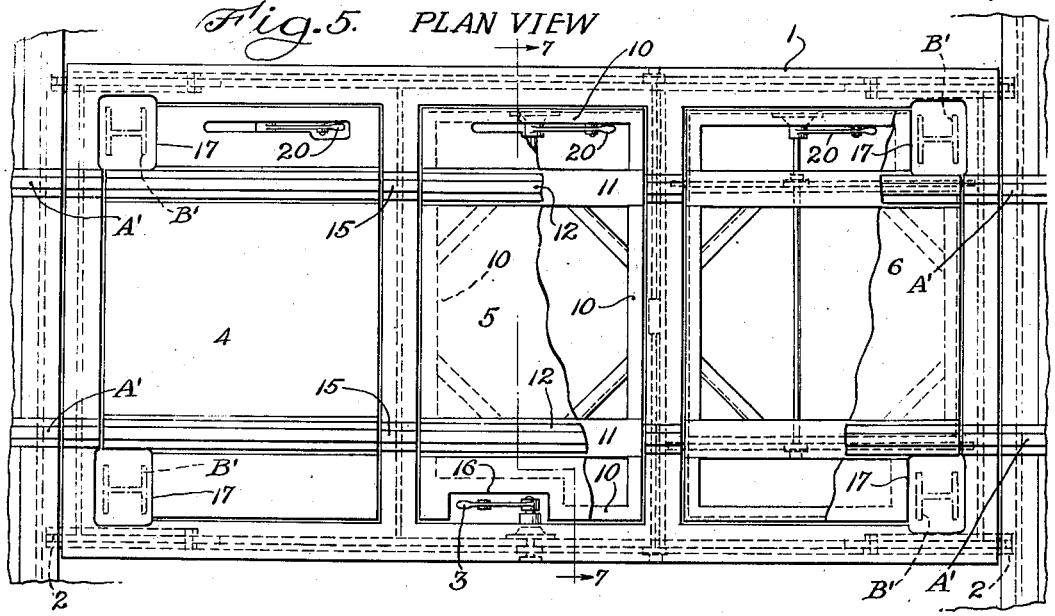
Fig. 5. PLAN VIEW
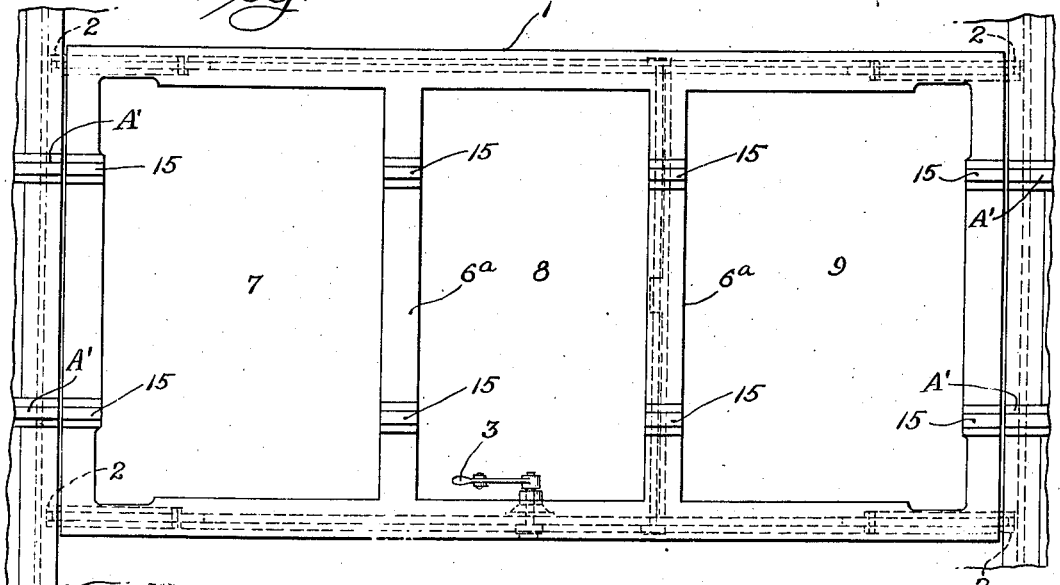
Fig. 6.
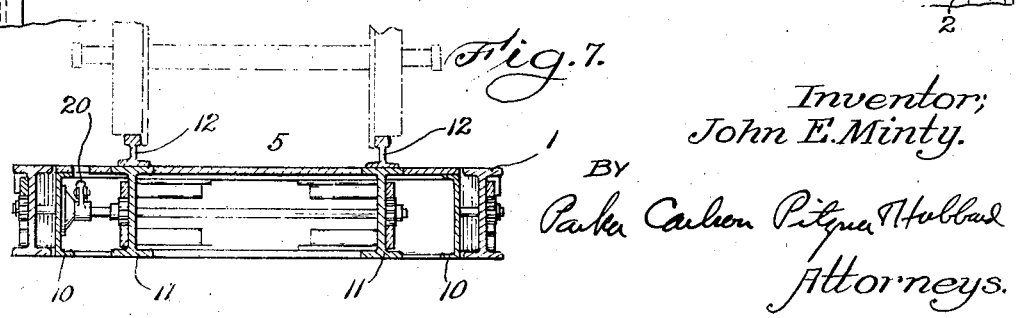
Fig. 7.
Inventor;
John E. Minty.
BY
Parker Carlson Pitgua Hubbard
Attorneys.

April 9, 1940.   J. E. MINTY   2,196,468
DROP PIT APPARATUS
Filed Nov. 7, 1935   7 Sheets-Sheet 4
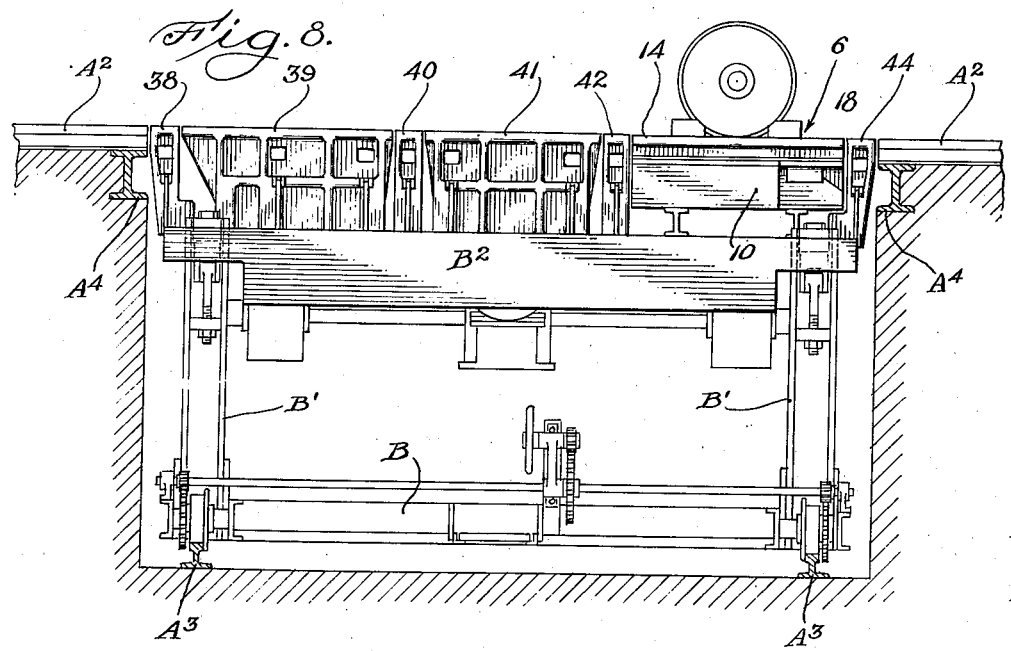
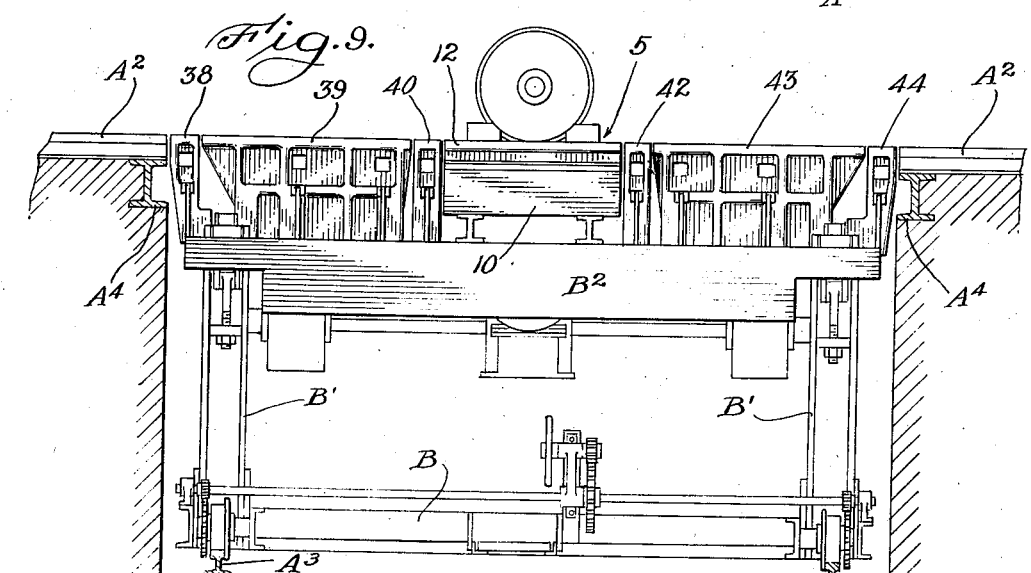
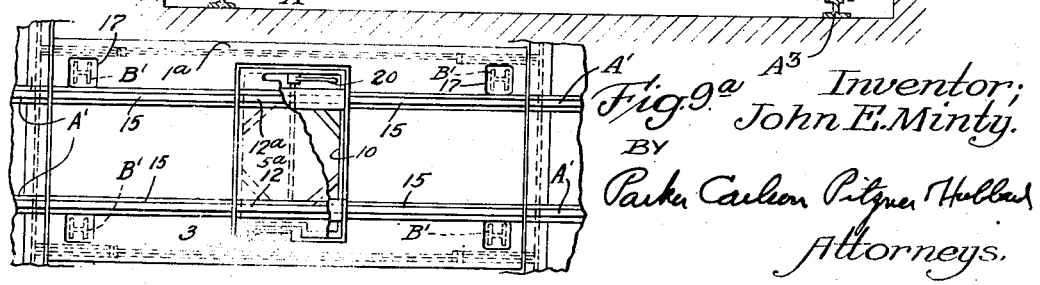
Inventor;
John E. Minty.
BY
Parker Carlson Pitzner Holbart
Attorneys.

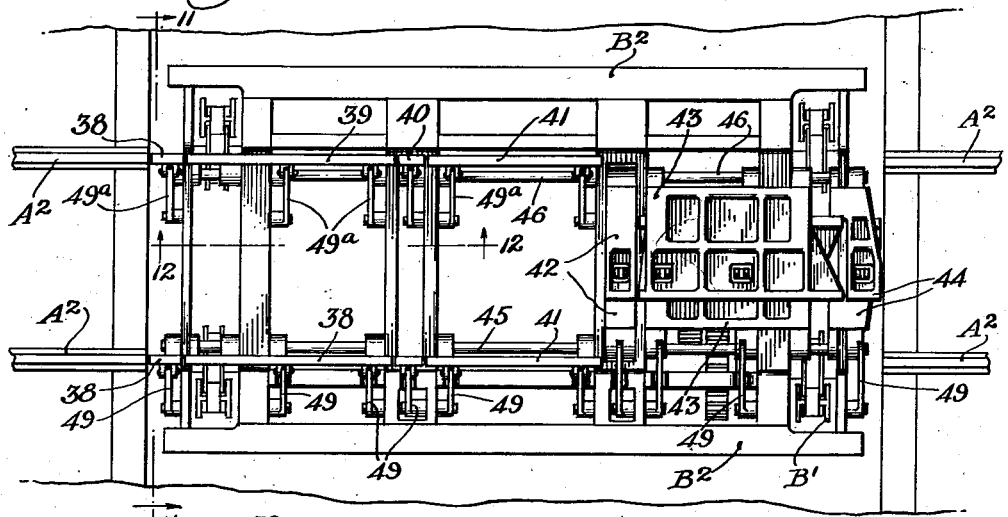
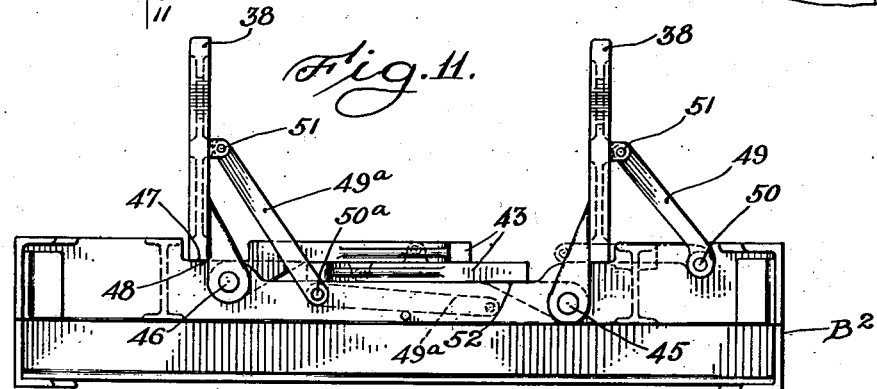
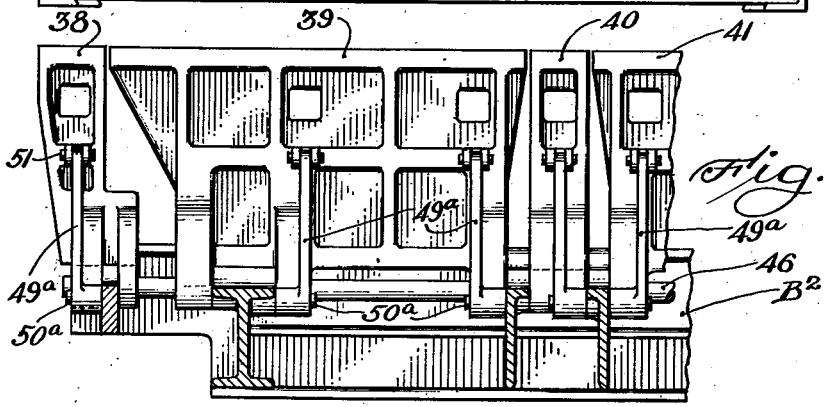

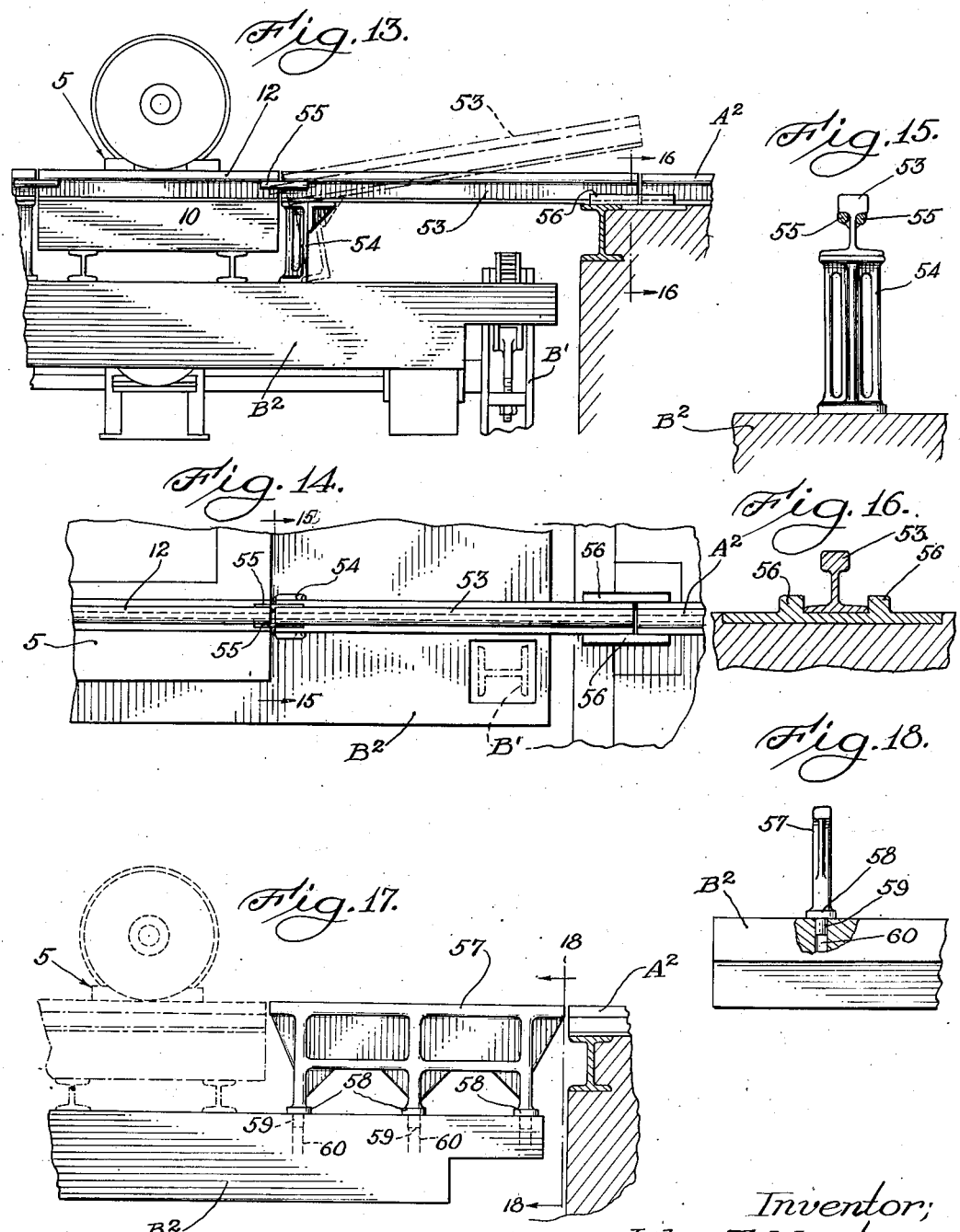

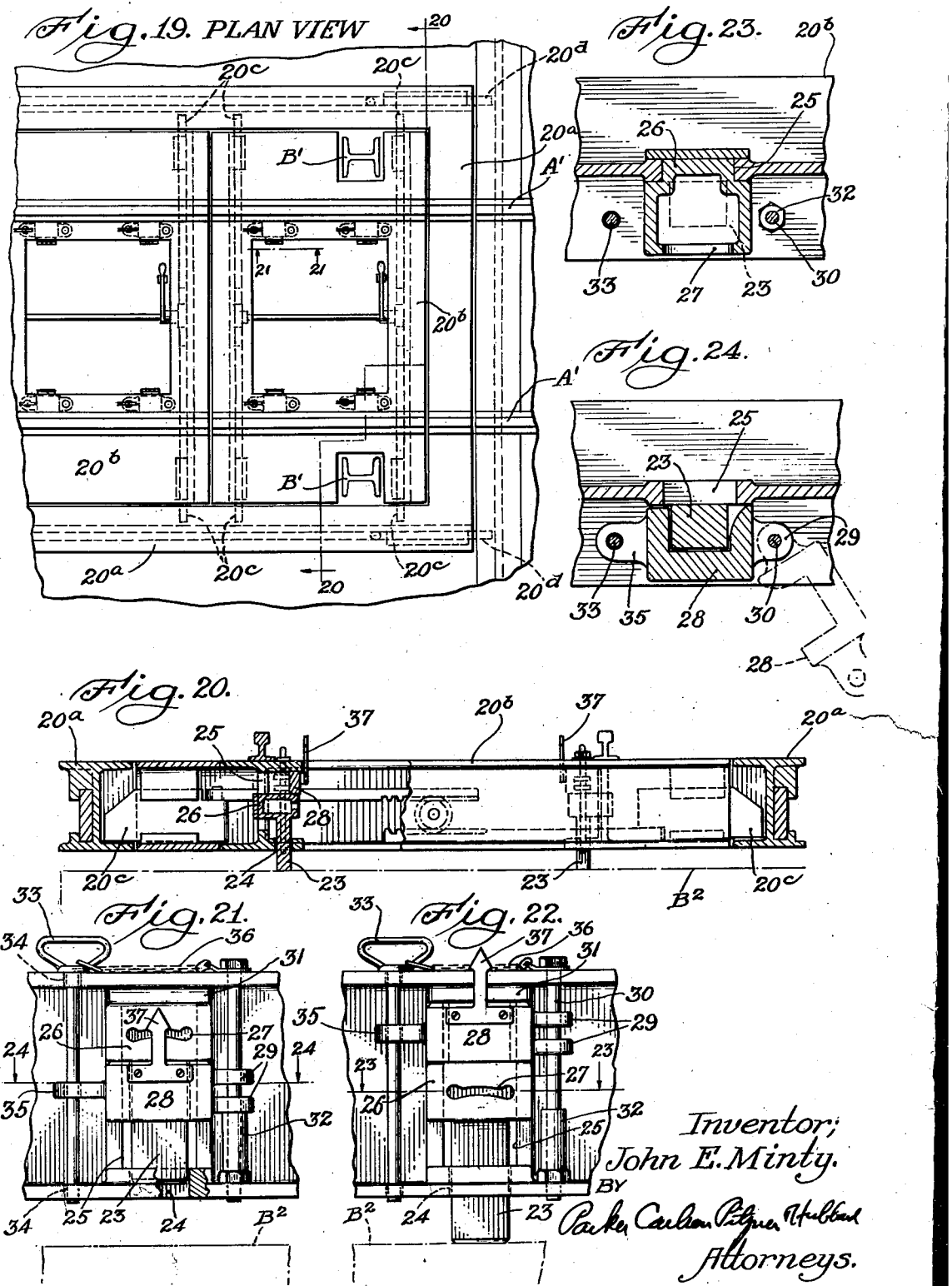

Patented Apr. 9, 1940

2,196,468

UNITED STATES PATENT OFFICE 2,196,468

DROP PIT APPARATUS

John E. Minty, Muskegon, Mich., assignor, by mesne assignments, to Manning, Maxwell & Moore, Inc., New York, N. Y., a corporation of New Jersey Application November 7, 1935, Serial No. 48,728

30 Claims. (Cl. 104—32)

This invention relates to apparatus of the general type disclosed in the Blake Patent No. 1,849,972. Such apparatus has heretofore been used principally in roundhouses and division point back shops to facilitate the removal of wheels and trucks from locomotives, to transport the wheels, etc., from the locomotive to a service track, and to return them to the locomotive.

The object of the present invention is to extend the field of usefulness of such apparatus by making it especially adapted to the overhaul and maintenance of Pullman cars, passenger coaches and freight cars, and to the removal of a pair of small wheels from a pony truck or a trailer truck of a locomotive. The means by which this object has been attained will be apparent from the following detailed description of the construction shown in the accompanying drawings, in which Figure 1 is a transverse sectional view of a drop pit showing one form of table top embodying the present invention as supported in operative relation to a repair track in an engine house, division point back shop or car shop, and a passenger car being shown as standing upon said track with one truck standing upon the table.

Fig. 3 is a view similar to Fig. 2, but showing the said sub-top as having been lowered into position where the pair of wheels standing thereon will clear the table top.

Fig. 4 is a cross-sectional view of the pit taken at a service track and showing the before-mentioned sub-top as having been raised into position to permit the pair of wheels to be rolled off the sub-top and onto the service track.

Fig. 5 is a fragmental plan view of the pit showing the table top as latched in position.

Fig. 6 is a view similar to Fig. 5, all of the sub-tops having been removed for the sake of clearness in showing the remainder of the table top.

Fig. 7 is a transverse sectional view of the table top on the line 7—7 of Fig. 5.

Fig. 8 is a view similar to Fig. 4, but showing means whereby the pair of wheels may be rolled off the sub-top in either direction.

Fig. 9 is a view similar to Fig. 8, but showing another sub-top in use.

Fig. 9a is a plan view similar to Fig. 5, but showing a table having a single sub-top.

Fig. 10 is a plan view of the construction shown in Figs. 8 and 9, but with the parts in a different position.

Fig. 11 is a view in the plane of dotted line 11—11 of Fig. 10.

Fig. 12 is a fragmental longitudinal sectional view taken in the plane of dotted line 12—12 of Fig. 10.

Fig. 13 is a fragmental view showing a sub-top as having been transported and raised into alinement with a service track, and illustrating another form of device to permit a pair of wheels to be rolled off the sub-top and onto the service track.

Fig. 14 is a plan view of the parts shown in Fig. 13.

Fig. 15 is a section on line 15—15 of Fig. 14.

Fig. 16 is a section on line 16—16 of Fig. 13.

Fig. 17 is a view similar to Fig. 13, but showing a third form of device to permit a pair of wheels to be rolled onto the service track.

Fig. 18 is a view on line 18—18 of Fig. 17.

Fig. 19 is a fragmental top plan view intended primarily to illustrate an alternative means to cause a table top to be raised above the normal level.

Fig. 20 is a section on line 20—20 of Fig. 19.

Fig. 21 is a view looking in the direction indicated by the line 21—21 of Fig. 19.

Fig. 22 is a view similar to Fig. 21, but showing the parts in a different position.

Figure 1:
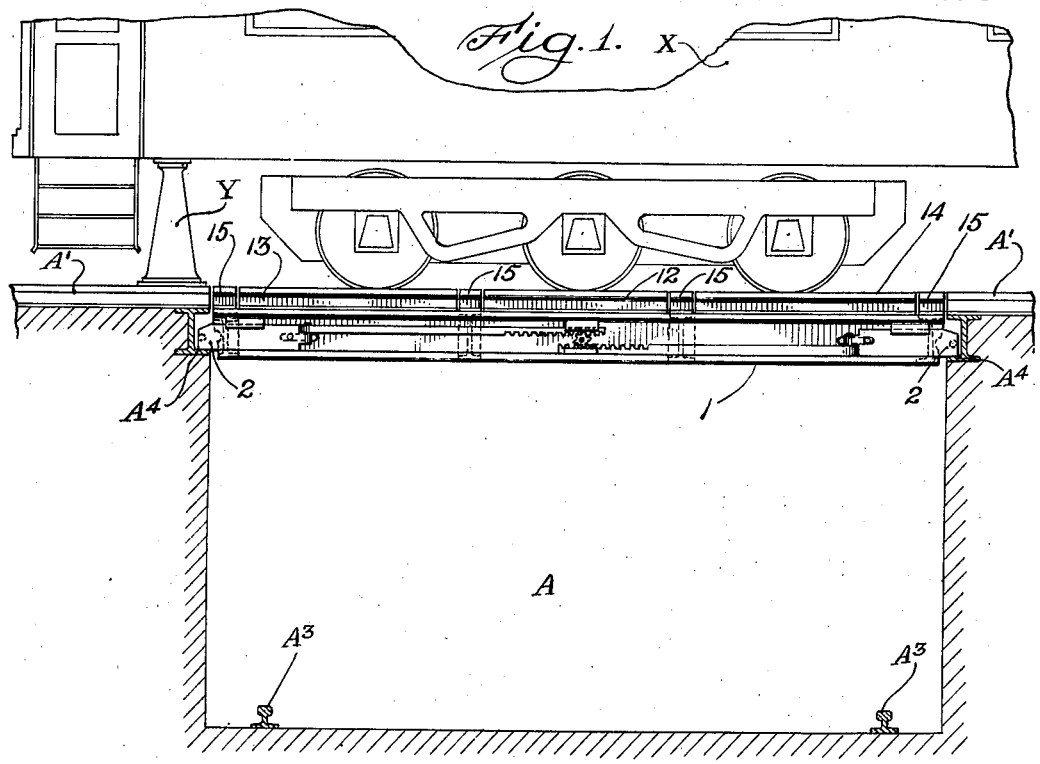

Figs. 23 and 24 are views taken in the plane of lines 23—23 and 24—24, respectively, of Figs. 22 and 21.

The present invention may be used in connection with various arrangements of pits and trackage. In the drawings, I have indicated a pit A which may be constructed in any desired manner and which intersects and extends beneath any desired number of railroad tracks. Those upon which cars or locomotives may be positioned for servicing or maintenance may be designated as repair tracks. The repair track shown in the drawings is marked $A^1$. Between two adjacent repair tracks there is usually a service track, as, for example, the track $A^2$ shown in Figs. 4, 8, 9, 10, 13, 14 and 17. Each repair track $A^1$ is bridged across the pit A by means of a table top which is latched in position so that it may be released and lowered into the pit with a load standing thereon and transported in the pit (beneath another table top, if necessary) into the vertical plane of any desired service track, and then raised into alinement with such service track so that the load may be rolled off the table top and onto the service track. The same or another load may be then placed on the table top, lowered into the pit, transported in the pit to a position beneath the car or locomotive being serviced, and then raised into operative relation to the car or locomotive.

The means for raising, lowering and transporting a table top may be of any desired construction which is capable of supporting a load that is not centrally located upon the table top, but is preferably of the type fully disclosed in the before-mentioned Blake patent, to which reference is made for an understanding of mechanisms not herein disclosed in detail.

Briefly described, the raising, lowering and transporting apparatus indicated in the present drawings comprises a trolley B arranged to travel upon rails $A^3$ running lengthwise of the pit. Rigidly secured to the trolley B are four rigid columns $B^1$. A carriage $B^2$ is suspended from the upper ends of the columns $B^1$ by means of cables which are connected to winding drums mounted on the lower side of the carriage $B^2$, said winding drums being arranged to be rotated to unwind or wind up the cables by means of an electric motor $B^3$. The columns $B^1$ are of such height as to pass under any table tops which may be latched in position to bridge the pit.

Referring now to the form of table top shown in Figs. 1, 2, 3, 5, 6, 7 and $9^a$: It comprises a rigid rectangular framework 1 arranged to be supported by any suitable means in position to bridge the gap in a repair track or a service track. The supporting means herein shown comprises four latches 2 slidably mounted in the frame 1 at the corners thereof and adapted to rest upon supporting ledges $A^4$, such ledges being provided at all of the tracks $A^1$ and $A^2$. The latches 2 may be connected together for simultaneous movement into and out of effective position by any desired means, as, for example, that fully disclosed in the Blake patent, such means comprising a hand lever 3 (Figs. 5 and 6).

The form of table top shown in the Blake patent (illustrated particularly in Figs. 5 and 7 thereof) is of unitary construction. The form of table top shown in Figs. 1, 2, 3, 5, 6, 7 and $9^a$ of the present drawings may be raised, lowered and transported as a unit, as in the case of the Blake construction, but it further comprises one or more sub-tops or table sections which may be raised, lowered and transported independently of the remainder of the table top, thus allowing removal of a pair of small wheels from a pony truck or a trailer truck of a locomotive, or from a railway car, while the weight of the locomotive, Pullman car or freight car is carried by the main body of the table top latched in position to bridge the pit. In Figs. 1, 2, 3, 5, 6 and 7, the table top is shown as comprising three sections or sub-tops 4, 5 and 6. The sub-tops may be of different sizes. As will be understood from Fig. 6, the frame 1 comprises two cross-beams $6^a$ which define openings 7, 8 and 9 in which the sub-tops 4, 5 and 6, respectively, are detachably supported. The table shown in Fig. $9^a$ comprises a frame $1^a$ which is similar in all respects to the frame 1 except that it is provided with a single opening $8^a$ for receiving a sub-top $5^a$ identical with the sub-top 5.

Each sub-top comprises a rigid frame which may be generally rectangular in form and braced in any desired manner. Since the sub-tops 4, 5, $5^a$ and 6 are essentially similar, it will be sufficient to refer to Figs. 5 and 7, wherein the perimetral frame of the sub-top 5 is shown at 10, said frame being adapted to fit into the opening 8. Rigidly secured within the frame 10 are two I-beams 11 in the vertical plane of the track rails. On these beams are mounted rail sections 12 adapted to aline with the rails forming the tracks $A^1$ and $A^2$. Each of the sub-tops 4, 5, $5^a$ and 6 carries rail sections such as the sections 12, those for sub-top $5^a$ being numbered $12^a$, those for the sub-top 4 being numbered 13 and those for the sub-top 6 being marked 14. To bridge the gaps between the rail sections 12, 13 and 14, the main frame 1 of the table top carries rail sections 15.

The sub-top 5 has a recess 16 at one side to accommodate the hand lever 3. The sub-tops 4 and 6 have recesses 17 to afford clearance for the columns $B^1$ when one of said sub-tops is lowered.

The sub-tops 4, 5, $5^a$ and 6 may be detachably connected to the main frame of the table top by any preferred means, as, for example, slidable latches 18 (Figs. 2 and 4) adapted, projected, to rest upon ledges 19 (Fig. 2) provided upon the end beams and cross beams of the main frame and arranged to be projected and retracted in unison by means similar to that provided for the latches 2 and comprising a hand lever 20 (Fig. 5).

In Fig. 19 I have illustrated another form of table top in which the main frame $20^a$ has no cross beams between the sub-tops $20^b$. The sub-tops $20^b$ have latches $20^c$ that rest upon the side beams of the main frame $20^a$. The latter is equipped with latches $20^d$ like the latches 2.

Figure 2:
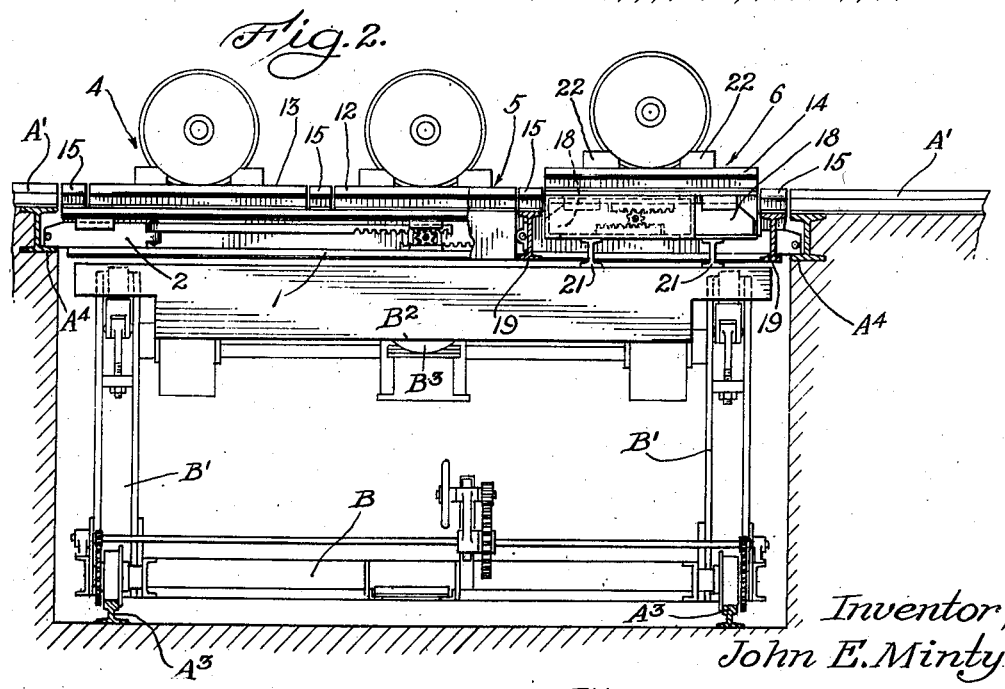
Fig. 2 is a view similar to Fig. 1, but showing the elevating and transporting apparatus as having been positioned beneath the table top and one sub-top of the table top as having been raised.

When a sub-top is to be lowered from its position in the main frame 1, it is desirable first to raise the sub-top slightly to relieve the pressure upon the latches 18 so that said latches may be easily retracted into the position shown in Figs. 2 and 4. It may also be desired to raise the sub-top to a slight extent above the general level of the table top to facilitate the release of the pair of wheels from the car or locomotive. I have herein shown two different provisions for enabling a sub-top to be raised above the general level of the table top. Referring first to Figs. 2, 3 and 4: When a sub-top is to be lowered into the pit two bars 21 may be placed upon the carriage $B^2$ directly below said sub-top before the carriage $B^2$ is raised to receive the sub-top. It will be apparent from Fig. 2 that when the carriage $B^2$ is raised, the bars 21 will come into contact with the bottom of the sub-top and jack it up above the general level of the table top, the rising movement of the carriage $B^2$ being suspended when the sub-top has been lifted to the desired extent. After the latches 18 have been retracted and any necessary work done to release the wheel assembly from the car or locomotive, chock blocks 22 may be placed in position to prevent the wheel assembly from rolling on the sub-top, after which the carriage $B^2$ may be lowered, as shown in Fig. 3, until the wheel assembly is below the main frame 1.

In Figs. 19 to 24, I have shown an alternative means to enable a sub-top to be raised above the general level of the table top. As shown in the last-mentioned views, each sub-top is provided with four jack posts 23 spaced apart so as to be adapted to support the sub-top and its load in stable equilibrium upon the carriage $B^2$. These jack posts are mounted on the sub-top for vertical sliding movement. As best shown in Fig. 20, the sub-top has an opening 24 through which the jack post may slide, and a guide opening 25 in which a guide portion 26 of the jack post is slidable. A hand-hole 27 or equivalent means is provided to facilitate raising the jack post into the retracted position shown in Fig. 21. To hold the jack in its retracted position or in the effective position shown in Fig. 22, I provide a block 28 having ears 29 which are pivoted and vertically slidable on a pivot bolt 30 on the sub-top. The block 28 is adapted to lie between the head of the jack post 23 and an abutment 31 on the sub-top, as shown in Figs. 20 and 22, or it may be positioned below the head of the jack post to support the jack post in elevated position, as shown in Fig. 21. When in position to support the jack post as in Fig. 21, the lowermost ear 29 on the block 28 rests upon the upper end of a sleeve 32. To lock the block 28 in either of the positions shown in Figs. 21 and 22, I provide a pin 33 adapted to be passed through alined openings 34 in the sub-top and through a perforated ear 35 on the block 28. If desired, the pin 33 may be connected to the sub-top by means of a chain 36. A signal pointer 37 fixed to the block 28 projects above the top of the sub-top when the block 28 is in position to act as an abutment for the jack post 23.

When a sub-top has been lowered with a load and transported away from the car or locomotive, the load may be lifted out of the pit by means of an overhead crane, or the sub-top may be raised into the horizontal plane of a service track A², as shown in Fig. 4, so that the load may be rolled off the sub-top onto the service track. It may be desirable in some instances to roll the load onto the service track in one direction and in other instances in the opposite direction. To bridge the gap between the particular sub-top which is in use and the portion of the track A² toward which the load is to be rolled, I may provide the hinged rail supports shown in Figs. 4, 8, 9, 10, 11 and 12, or detachable rail supports, two forms of which are shown in Figs. 13 to 18, inclusive.

Referring first to the hinged form of rail support: As will be understood from Figs. 8, 9, 10 and 11, the carriage B² is equipped with two sets of hinged rail supports or gate rails of such lengths and so related to the sub-tops as to be adapted to bridge the space at both sides of any one of the sub-tops. These gate rails are numbered 38, 39, 40, 41, 42, 43 and 44. As indicated in Figs. 10 and 11, there are two rows of such gate rails, the gate rails of each row being pivoted to swing upon a common axis. In Fig. 11, the axis for the right-hand row of gate rails is designated 45, and the axis of the other row of gate rails is numbered 46.

When arranged in vertical position (as shown in Figs. 8, 9 and 11) the upper edges of the gate rails constitute rails upon which the load may be rolled across the carriage B² and onto the service track A². Any desired means may be provided to hold the gate rails in vertical position. In Fig. 11 I have shown the gate rails and the carriage B² as provided with coacting surfaces 47 and 48 which are in contact when the gate rail is in operative position. The gate rail is held in such position by means of a diagonal brace which may partake of various forms; herein I have shown for each gate rail one or more braces, those for the right-hand row of gate rails, as viewed in Fig. 11, being numbered 49, and those for the left-hand row being numbered 49ª. The braces 49 of the carriage are pivoted at 50 and the braces 49ª at 50ª. The braces are detachably connected to the gate rails by means of withdrawable pins or the like 51. When detached from their braces, the gate rails are adapted to fold toward each other and lie in overlapped relation in a recess 52 in the upper surface of the carriage B² so as not to prevent contact of the upper surface of the carriage B² with the lower side of a sub-top or the entire table top. The braces 49 and 49ª also are pivoted so that they may be swung down into an out-of-the-way position.

Referring now to Figs. 13 to 16, inclusive, which illustrate a detachable type of cross-over unit: This type contemplates the provision of several cross-over units of proper length to bridge the gap between any one of the sub-tops 4, 5 and 6 and the desired end of a service track A². Each cross-over unit comprises a rail section 53 secured at one end to a bracket 54 of any desired form adapted to stand upon the carriage B². To one end of the rail section 53 are secured locating pins 55 adapted to lie at opposite sides of the web of the rail section on the sub-top to hold the rail section 53 in line with the rail section on the sub-top. At opposite sides of the ends of each rail forming a track A² are ribs 56 between which the rail 53 is adapted to lie and thus be held in alinement with a rail of the track A². It will be seen that the cross-over unit just described may be placed in position as indicated in full and dotted lines in Fig. 13, and lifted out of place and set aside after it has served its purpose.

Figs. 17 and 18 illustrate another form of detachable cross-over unit which also would be provided in various lengths to bridge the gap between any sub-top and the desired end of a service track. 57 is a demountable rail unit having feet 58 adapted to rest upon the top of the carriage B² and having studs 59 adapted to fit into openings 60 in said carriage to support the rail section 57 in upright position in alinement with a service track rail.

Summarizing the operation and assuming that a Pullman car X has been placed upon a repair track A¹ with one of its six-wheel trucks "spotted" on the table top (as shown in Fig. 1) and that the right-hand pair of wheels is to be removed: The elevating and transporting apparatus is moved on the rails A³ into position below the table top. While it is seldom necessary to lift a pair of Pullman wheels before releasing them from the truck, we shall assume, in order to show the capabilities of the apparatus, that it is desirable in this instance to do so. A pair of elevating bars 21 is placed upon the carriage B² directly below the sub-top 6 upon which the right-hand pair of wheels is standing. The carriage B² is then raised to bring the bars 21 into contact with the bottom of the sub-top 6, the carriage B² being raised until the pair of wheels has been lifted to the desired extent. The wheels having been released from the truck and blocked on the rail sections 14 and the latches 18 having been retracted (as shown in Fig. 2), the carriage B² is lowered with the sub-top 6 and its load standing thereon (as shown in Fig. 3) until the load is below the frame 1 of the table top. The elevating and transporting apparatus is then moved upon the rails A³ until the rail sections 14 are in the vertical planes of the rails forming a service track A². The carriage B² is then elevated to place the rail sections 14 in horizontal alinement with said service track (as shown in Fig. 4). If the pair of wheels is to be rolled off to the right (as viewed in Fig. 4), the two gate rails 44 on the carriage B² are swung up into vertical position and secured in such position by means of the braces 49 and 49ª, after which the blocks 22 are removed and the wheels rolled onto the service track A².

If the pair of wheels was to be rolled off to the left, or if a new pair of wheels is to be rolled onto the sub-top from the left, the gate rails 38, 39, 40, 41 and 42 would be placed in operative position, as shown in Fig. 8.

As will be understood from Fig. 9, any of the pairs of wheels may be removed and placed upon a service track, as explained in connection with the right-hand pair of wheels.

If desired, the entire truck may be removed as a unit, jacks Y being first placed under the end of the car body. The table top is raised sufficiently so that the latches 2 are out of contact with the ledges A⁴, after which the latches are withdrawn and the table top lowered into the pit and transported to and raised into line with the desired service track.

When elevating bars 21 are employed, it is necessary for the workman to descend into the pit for the purpose of placing them on the carriage B². When jack posts 23 are used, they may be placed in operative position without going into the pit.

A table top containing one or more sub-tops allows the removal of a pair of small wheels from a pilot truck or a trailer truck of a locomotive, while the weight of the locomotive is transmitted through the truck to the main frame of the table top latched in its position as a bridge across the pit. When a pair of drive wheels is to be removed, the table top, with its sub-tops locked into it, is used as a unit, the weight of the locomotive being carried by the remaining locomotive wheels at opposite sides of the pit.

As hereinbefore stated, the table top may be equipped with various numbers of sub-tops, depending upon the size and class of locomotives and cars to be serviced. When the table top is equipped with a single sub-top as shown in Fig. 9ᵃ, it may be used for servicing the leaders, drivers and trailers of locomotives and pairs of wheels from freight, passenger and Pullman car trucks, as hereinbefore explained. In this instance, the end sections of the main table top are constructed integrally with the frame instead of being removably secured thereto as in the case of the three-section table top. While the use of a single sub-top requires that the engine or car be "spotted" for each pair of wheels removed, it nevertheless affords more expeditious and a more flexible range of operation than with one-piece table tops.

A table top having one narrow sub-top and one wide sub-top is well adapted to use in repair shops where locomotives fitted with booster engines are serviced; the table top with the sub-tops locked in position may be used as a unit when removing main driving wheels; the narrow sub-top may be employed when removing leading wheels or tender wheels individually while the weight of the truck and locomotive is carried on the main table frame; and the wide sub-top may be used when lowering the complete booster engine truck for inspection or repair.

A table top equipped with three sub-tops is particularly suited for handling individual pairs of wheels of passenger and freight cars and locomotive tenders, being also adapted for use in removing an entire truck. In the case of six-wheel trucks, a truck is "spotted" so that the center pair of wheels is over the center sub-top, after which any of the three pairs of wheels may be removed individually without changing the position of the car or tender.

It will be understood that the invention is not limited to the details herein disclosed, except to the extent indicated in the appended claims.

I claim as my invention:

1. In a drop pit, a table top comprising a main frame, a plurality of subtops detachably secured in said main frame, and rail sections extending across the main frame and the subtops to form a substantially continuous railroad track upon the table top.

2. In a drop pit, a table top comprising a main portion and a subtop detachably secured in said main portion, and rail sections extending across the main portion and the subtop to form a substantially continuous railroad track upon the table top.

3. In a drop pit having side walls with supporting ledges thereon, a table top comprising a main frame, latches on the main frame adapted to rest upon said ledges, and a subtop fitting within the main frame and having latches adapted to rest upon the main frame.

4. A detachable cross-over unit for use in a drop pit, consisting of a rail section, a supporting bracket under one end thereof, and alining means mounted directly upon that end of the rail section to coact with the vertical web of another rail section, the opposite end of the first rail section being adapted and arranged to rest directly and removably upon the wall of the pit.

5. In drop pit apparatus, a raising and lowering carriage having openings in its upper surface, and a cross-over unit adapted to stand on the carriage and having on its lower portion locating studs to fit in said openings, and having on its upper portion means constituting rail sections.

6. In drop pit apparatus, a railroad track, a drop pit intersecting the track, a raising and lowering apparatus in the pit comprising a carriage adapted to support a table-top section having rail sections, said rail sections being adapted to aline with the railroad track, and means adapted to be removably positioned on the carriage while the latter is supporting the table-top section with its rail sections in alinement with the railroad track, said means constituting rails filling a gap between one end of the railroad track and the adjacent end of said rail sections.

7. In drop pit apparatus, a railroad track, a drop pit intersecting the track, a raising and lowering apparatus in the pit adapted to support a table-top section having rail sections, said rail sections being adapted to aline with the railroad track, and means adapted to be positioned on the raising and lowering apparatus alongside the table-top section to constitute rails alined with and filling a gap between one end of the railroad track and the adjacent end of said rail sections.

8. In drop pit apparatus, a railroad track, a drop pit intersecting the track, a raising and lowering apparatus in the pit comprising a carriage adapted to support a table-top section having rail sections, said rail sections being adapted to aline with the railroad track, and means adapted to be positioned on the carriage to constitute rails filling a gap between one end of the railroad track and the adjacent end of said rail sections.

9. In drop pit apparatus, a raising and lowering apparatus comprising a carriage, members hinged to said carriage on parallel axes and adapted to be swung up into parallel vertical position to form railroad rails, and adapted to be swung down into a position below the top of the carriage, and means to hold said members in vertical position.

10. In drop pit apparatus, a raising and lowering apparatus comprising a carriage, members hinged to said carriage on parallel axes and adapted to be swung up into parallel vertical position to form railroad rails, and adapted to be swung down, into overlapping position, into a recess in the top of the carriage, and means to hold said members in vertical position.

11. In drop pit apparatus, a raising and lowering apparatus comprising a carriage, members hinged to said carriage on parallel axes and adapted to be swung up into parallel vertical position to form railroad rails, and adapted to be swung down, into overlapping position, into a recess in the top of the carriage, and braces to hold said members in vertical position, said braces being adapted to be placed in a position below the top of the carriage when said members are in said recess.

12. A table top to bridge a drop pit, said table top comprising a plurality of sections having means for supporting each section independently of the other, and each section having connected thereto means adapted to project below the section for use in jacking one section above the other.

13. A drop pit table top section having thereon a plurality of vertically slidable posts, and means associated with each post for holding said post in either of two positions, in one of which the post projects below the table top section and in the other of which the post is elevated into a retracted ineffective position.

14. In drop pit apparatus, a raising and lowering apparatus comprising a carriage adapted to support a subtop having rail sections, and means on the carriage to form prolongations of the rail sections on the subtop.

15. In drop pit apparatus, the combination in a drop table for bridging a pit, of an outer section having rigidly connected end portions and adapted to carry a plurality of pairs of wheels, an inner section disposed in the outer section and adapted to drop a single pair of wheels, means for latching the outer section across the pit, and means for releasably supporting the inner section from the outer section so that it may be dropped independently of the outer section and while the outer section remains in pit-bridging position to support contiguous pairs of wheels.

16. In drop pit apparatus, the combination in a drop table for bridging a pit, of an outer section having rigidly connected end portions and adapted to carry a plurality of pairs of wheels, an inner section disposed in the outer section and adapted to drop a single pair of wheels, means for latching the outer section across the pit, and means for releasably supporting the inner section from the outer section so that it may be dropped independently of the outer section and while the outer section remains in pit-bridging position to support contiguous pairs of wheels, both sections being adapted, when latched together, to drop all of the wheels on a truck into the pit.

17. In drop pit apparatus, the combination in a drop table for bridging a pit, of an outer section having end portions adapted to carry a plurality of pairs of wheels, an inner section disposed in the outer section and adapted to drop a single pair of wheels, means for latching the outer section across the pit, and means for releasably supporting the inner section from the outer section so that it may be dropped independently of the outer section and while the outer section remains in pit-bridging position to support contiguous pairs of wheels.

18. In drop pit apparatus for removing sets of wheels from railroad locomotives and the like, the combination in a drop table for bridging a pit, of an outer section comprising two end portions rigidly connected together and adapted to carry a plurality of pairs of wheels, an inner section disposed in the outer section and adapted to drop a single pair of wheels, means for latching the outer section across the pit, and means for releasably supporting the inner section from the outer section so that it may be dropped independently of the outer section and while the outer section remains in pit-bridging position to support contiguous pairs of wheels, both sections being adapted, when latched together, to drop all of the wheels on a truck into the pit.

19. In drop pit apparatus, the combination in a drop table for bridging a pit, of an outer table section, an inner section adapted to be dropped independently of the outer section, means for releasably supporting the outer table section at both of its ends from the walls of the pit, means for releasably supporting the inner section from the outer section, and spacing means adapted to be interposed under the inner section, and whereby the inner section may be lifted above track level while the outer section remains supported by the pit walls.

20. In drop pit apparatus for removing sets of wheels from railway locomotives or the like, the combination in a drop table adapted to bridge a pit, of a plurality of sections, one of said sections being disposed within, and adapted to be dropped with or independently of the other section, means for releasably supporting both ends of the outer section from the walls of the pit, means for releasably supporting the inner section from the outer section, a lifting carriage adapted to cooperate with said sections, and a plurality of spacing members mounted on said inner section for movement into active or inactive positions, said members when in active position being engageable by said carriage whereby to lift the inner section above the level of the outer section, said carriage engaging both sections simultaneously when said members are in inactive position.

21. In a drop pit apparatus for removing and replacing the wheels of railroad locomotives and the like, in combination, a railroad track, a drop pit intersecting the track, a unitary drop table for bridging said pit comprising an outer section extending across the pit and having rails mounted thereon for alinement with said track, an inner section disposed within said outer section having rails mounted thereon for alinement with the rails of said outer section, the several rails constituting an extension of the track across the pit capable of accommodating a plurality of pairs of wheels of a locomotive or the like, one of said pairs of wheels being carried by the rails of said inner section, means releasably supporting the outer section from the sides of the pit so that the table may be lowered as a unit to drop said plurality of pairs of wheels, and means for releasably supporting said inner section from said outer section so that it may be lowered independently of the outer section to drop said one pair of wheels while the outer section remains in pit-bridging position to support the other pairs of wheels.

22. In a drop pit apparatus, the combination in a drop table for bridging a pit, of an outer section having rigidly connected end portions adapted to carry a pair of wheels, an inner section centrally disposed in the outer section, and adapted to support a pair of wheels, means for latching the outer section across the pit, and means for releasably supporting the inner section from the outer section so that it may be dropped independently of the outer section.

23. In drop pit apparatus, the combination in a drop table for bridging a pit, of an outer section having rigidly connected end portions adapted to carry wheels, an inner section centrally disposed in the outer section, and adapted to support a pair of wheels, means for latching the outer section across the pit, and means for releasably supporting the inner section from the outer section so that it may be dropped independently of the outer section, both sections having means simultaneously engageable by lifting mechanism so the sections may be lowered together to drop a truck.

24. In drop pit apparatus, the combination in a drop table for bridging a pit, of an outer section having rigidly connected end portions adapted to carry wheels and a substantially rectangular opening, an inner section centrally disposed in the outer section, fitting in said opening, and adapted to support a pair of wheels, means for latching the outer section across the pit, and means for releasably supporting the inner section from the end portions of the outer section, so that it may be dropped independently of the outer section.

25. In drop pit apparatus, the combination in a drop table for bridging a pit, of an outer section comprising end portions, rail sections adapted to carry a pair of wheels and side-beams rigidly connecting said end portions, an inner section centrally disposed in the outer section, and provided with rail sections to carry a pair of wheels, means for latching the outer section across the pit, and means between the contiguous end portions of the sections for releasably supporting the inner section from the outer section so that the inner section may be dropped independently of the outer section.

26. In drop pit apparatus, the combination in a drop table adapted to bridge a pit, of an outer section comprising side-beams adapted to extend across the pit and a plurality of cross-beams at each of its ends providing end portions adapted to carry wheels, a substantially rectangular central opening being provided in the outer section, an inner section centrally disposed in the outer section, fitting substantially in said opening and adapted to support a pair of wheels, means for latching the ends of the outer section to the pit, and means between the end portions of the outer section and the inner section for releasably supporting the inner section so that it may be dropped independently of the outer section.

27. In drop pit apparatus, the combination in a drop table adapted to bridge a pit, of an outer section comprising side-beams adapted to extend across the pit and a plurality of cross-beams at each of its ends providing end portions adapted to carry wheels, a substantially rectangular central opening being provided in the outer section, an inner section centrally disposed in the outer section comprising cross-beams, fitting substantially in said opening in the outer section, and adapted to support a pair of wheels, means for latching the ends of the outer section to the pit, and means between the end portions of the outer section and the inner section for releasably supporting the inner section so that it may be dropped independently of the outer section, the cross-beams of both sections being simultaneously engageable by a lifting carriage, to drop both sections together.

28. In drop pit apparatus, the combination in a drop table for bridging a pit, of a plurality of sections, one of the sections being adapted to be dropped independently of the other, means for releasably supporting one of the table sections from the walls of the pit, means for releasably supporting the other section from the first mentioned section, and spacing means adapted to be interposed between one of the sections and lifting mechanism, whereby the said latter section may be lifted above track level while the other remains supported by the pit walls.

29. In a drop pit apparatus, a drop table assembly comprising, in combination, a main section adapted to bridge a pit, a plurality of auxiliary sections assembled with said main section, latch means supporting the main section on the sides of the pit, means for withdrawing said latch means to release the table assembly for lowering into the pit as a unit, other latch means supporting said auxiliary sections on said main section, and means for withdrawing said other latch means to release each auxiliary section for lowering into the pit while the main sectiin remains in pit bridging position.

30. A drop table assembly for bridging the pit intersecting a railroad track, said table assembly comprising, in combination, a main section extending across the pit and having rails mounted thereon for alinement with the track, a plurality of auxiliary sections assembled with said main section, each of said auxiliary sections having rails mounted thereon for alinement with the rails of the main section, the rails of the several sections constituting an extension of the track across the pit, means releasably supporting the main section on the sides of the pit so that the entire table assembly may be lowered into the pit as a unit, and means releasably supporting said auxiliary sections on said main section so that the auxiliary sections may be lowered into the pit independently of the main section while the latter remains in pit bridging position.

JOHN E. MINTY.